(12) United States Patent
Reyes Moreno

(10) Patent No.: US 7,409,259 B2
(45) Date of Patent: Aug. 5, 2008

(54) COMPUTER-ASSISTED METHOD FOR DESIGNING GARMENTS

(75) Inventor: Francisco Javier Reyes Moreno, Madrid (ES)

(73) Assignee: Reyes Infográfica, S.L., Madrid (ES)

( * ) Notice: Subject to any disclaimer, the term of this patent is extended or adjusted under 35 U.S.C. 154(b) by 0 days.

(21) Appl. No.: 11/172,586

(22) Filed: Jun. 30, 2005

(65) Prior Publication Data

US 2006/0015208 A1    Jan. 19, 2006

Related U.S. Application Data

(63) Continuation of application No. PCT/ES03/00277, filed on Jun. 9, 2003.

(30) Foreign Application Priority Data

Dec. 31, 2002   (ES)   ............................... 200300040

(51) Int. Cl.
*G06F 19/00*   (2006.01)

(52) U.S. Cl. ........................ 700/132; 700/130; 700/131; 345/419; 345/420; 345/630

(58) Field of Classification Search .................. 700/130, 700/131, 132, 303; 345/419, 420, 630; 434/395; 702/167

See application file for complete search history.

(56) References Cited

U.S. PATENT DOCUMENTS

| | | | |
|---|---|---|---|
| 4,539,585 A | * | 9/1985 | Spackova et al. ........... 382/100 |
| 4,546,434 A | * | 10/1985 | Gioello ........................ 700/90 |
| 5,056,160 A | * | 10/1991 | Buchanan ........................ 2/88 |
| 5,680,528 A | * | 10/1997 | Korszun ..................... 345/630 |
| 5,850,222 A | * | 12/1998 | Cone .......................... 345/418 |
| 6,310,627 B1 | * | 10/2001 | Sakaguchi .................. 345/630 |
| 6,404,426 B1 | * | 6/2002 | Weaver ....................... 345/419 |
| 6,462,740 B1 | * | 10/2002 | Immel ........................ 345/473 |
| 6,546,309 B1 | * | 4/2003 | Gazzuolo .................... 700/132 |
| 6,810,300 B1 | * | 10/2004 | Woltman et al. ............ 700/132 |

(Continued)

FOREIGN PATENT DOCUMENTS

GB              2130768 A    *    6/1984

(Continued)

*Primary Examiner*—Gary L. Welch
*Assistant Examiner*—Nathan E Durham
(74) *Attorney, Agent, or Firm*—Panitch Schwar Belisario & Nadel LLP

(57) ABSTRACT

A method is provided for designing garments including the following steps: a) providing, via computer, at least one garment mold (13) made up of a basic three-dimensional surface, personified by a body (2) enveloping cover. The above mentioned garment mold (13) has to be defined by parametric coordinates. b) adapting, via computer, the garment mold (13) to the above mentioned body (2) loosening and/or tightening different selected areas (15) of the garment mold (13) with respect to the body (2), according to the desired design. c) cutting and removing, via computer, selected areas of the garment mold (13) according to the aforementioned desired design. Additionally the method includes the possibility of applying textures and color attributes to the garment mold and digitally animating the body (2) along with the garment mold (13). The method may include as well an additional step to design via computer patterns starting from the information as defined in the garment mold (13), modeled according to the desired design.

3 Claims, 7 Drawing Sheets

U.S. PATENT DOCUMENTS

| | | | |
|---|---|---|---|
| 6,901,379 B1 * | 5/2005 | Balter et al. | 705/27 |
| 6,907,310 B2 * | 6/2005 | Gardner et al. | 700/132 |
| 6,968,075 B1 * | 11/2005 | Chang | 382/111 |
| 7,079,134 B2 * | 7/2006 | Kung et al. | 345/420 |
| 2001/0026272 A1 * | 10/2001 | Feld et al. | 345/419 |
| 2003/0011590 A1 * | 1/2003 | Kung et al. | 345/419 |
| 2004/0049309 A1 * | 3/2004 | Gardner et al. | 700/132 |
| 2005/0283267 A1 * | 12/2005 | Bingham et al. | 700/132 |

FOREIGN PATENT DOCUMENTS

| | | |
|---|---|---|
| WO | WO 0186512 A2 * | 11/2001 |

* cited by examiner

COMPUTER-ASSISTED METHOD FOR DESIGNING GARMENTS

CROSS-REFERENCE TO RELATED APPLICATIONS

This application is a continuation of International Application No. PCT/ES2003/000277, filed Jun. 9, 2003, which was published in the Spanish language on Jul. 15, 2004, under International Publication No. WO 2004/057988 A1 and the disclosure of which is incorporated herein by reference.

BACKGROUND OF THE INVENTION

This invention refers to a computer-assisted method for designing garments. The method covers the design of the desired garment starting from a basic model or three-dimensional garment mold and the semiautomatic design of patterns starting from this three-dimensional garment mold already modified.

The quality and value of any garment depend, to a large extent, on the characteristics of the fabrics and the well-cut and pattern making which were created with. A garment constitutes, basically, a complex surface that adapts more or less to the tree-dimensional volume of the person who wears it. The difficulty comes from the fact that each garment piece is obtained from a flat surface that must be joined to the rest of the pieces and has to be adapted to the different volumes of the individual body. With current techniques there are various ways to design garments by means of computer-assisted methods.

U.S. Pat. No. 4,558,420 of Gerber announces a procedure to produce garments starting from three-dimensional patterns. This procedure comprises, first of all, the action of digitalizing a body to be equipped with the garment by means of a robotic device connected to a computer. Then, it is necessary to deal with the digital details of the obtained coordinates to transfer orders to another robotic device connected to the computer equipped with a tool that confirms the output of a job. Then it would be necessary to give this work piece a three-dimensional surface corresponding to a specific area of the above mentioned body. And finally, it is necessary to physically model a piece or pattern of the garment with a plastic material using the aforementioned work piece. Repeating these operations for different areas of the body and assembling the obtained pieces or patterns, the entire garment is made up. The procedure envisages the possibility of draping the plastic material to communicate the garment piece one or more characteristics nor present initially in the plastic material.

The above mentioned patent of Gerber has a disadvantage however: it only provides garments in a plastic material that can be modeled and it needs of a three-dimensional model, previously designed, to be digitalized in order to obtain the molds of the patterns. In other words, it is more a mechanism to produce molds of patterns in a plastic material than a designing tool.

U.S. Pat. No. 5,495,568 of Beavin describes a computer and a method to design garments that comprises digitalizing the client's body, including anatomical measurements, constitution, weight, photographic details, etc., to create a three-dimensional mannequin of the client. This mannequin could be digitally animated. Then, it is necessary to introduce details of the fabric chosen to be assigned to a preselected garment. These details should include fabric's wear and friction characteristics, environmental information, such as temperature and humidity. The performance of the above mentioned garment is processed during the mannequin's movement. With this information we obtain some parameters of wear and life-span of the garment that are used to optimize the garment's adaptation to each individual client. It is even possible to show the client the results by means of a virtual image in motion.

However, in the procedure of the patent of Beavin the garment has to be previously designed and digitalized. The system only optimizes its characteristics starting from the client's attributes and the conditional environmental conditions in which the garment will be worn.

BRIEF SUMMARY OF THE INVENTION

One of the aims of this invention is to provide a computer-assisted method for designing garments, using computer and CAD (computer-assisted design) tools, that permits in an intuitive, easy and quickly way, giving shape and other attributes to a garment. This would be done making changes on a basic three-dimensional surface, personified (hereinafter "garment mold") by a body enveloping cover. This garment mold would be selected from among various garment molds with different predefined topologies.

Another aim of this invention is to provide the aforementioned computer-assisted method for designing garments to design as well patterns starting from the garment mold previously shaped as the garment using these computer and CAD tools.

According to this invention, the above aims as well as others are achieved providing a computer-assisted method for designing garments that comprises, first of all, to supply, via computer, at least one garment mold made up of a basic three-dimensional surface, personified by a body enveloping cover. This garment mold is defined by parametric coordinates and, preferably, using parameters according to the conventional tailoring measurements. After this, the method comprises the action of adapting via computer the garment mold to the above mentioned body loosening and/or tightening different selected areas of the garment mold with respect to the body, according to the desired design. And finally, to cut and remove via computer selected areas of the garment mold according to the aforementioned desired design. The actions of loosen, tighten, cut and remove can be done in any order or can even be alternated in various stages of design. So a designer can define the characteristics of the garment he/she wants to desire in an easy, quickly and intuitive way.

In the fashion field, the above mentioned body is, obviously, an anatomical three-dimensional mannequin of a human body. This mannequin is defined via computer by means of parametric coordinates and the garment mold is, in principle, closely adjusted to the body shape at the moment work begins. However, the method of this invention could be applied in other fields, such as upholstery, changing the mannequin for the model of a furniture's shape, with the garment mold n concordance.

Applying it in the fashion field, which is expected to be the most common, the method comprises selecting a garment mold from among a group of some garment molds including each one different topologies previously defined and stored in, at least, one RAM. Each garment mold typically comprises various pieces that are interconnected in a continuous way and each of these parts is a hollow spindle. It is stated that with a group of garment molds previously defined including at least one mold with the topology of cape, one with the topology of skirt and one with the topology of pants, it is possible to virtually design any kind of known garment.

For example, the above mentioned mold with the topology of cape can include a part of the neck, that covers the neck at least to half of the head, and part of the body, that globally covers the whole body at least to the floor. The garment mold with the topology of skirt includes, at least a part of the neck, that covers the neck at least to half of the head, a part of the torso, that covers the torso from the neck to the waist, two parts of sleeve, each one covers a respective arm from the torso to cover at least half of the hand, and part of the pant leg, that globally covers both legs from the waist at least to the floor. Whereas, the above mentioned garment mold with the topology of pants includes the same parts as the garment mold with the topology of skirt excepting that the aforementioned part of the pant leg is replaced with two parts, and each one covers a respective leg from the waist at least to the floor.

Starting from the garment mold with the topology of pants and then loosening, cutting and removing different selected parts, it is possible to design, for example, short or long trousers, or a T-shirt or a jacket, or even, for example, a pair of trousers matching with a T-shirt. Moreover, providing a garment mold with the part of the neck covering the entire head it would be possible to design, for example, garments with hoods or ski masks. Something similar would happen if the parts of sleeve of the garment mold would cover entirely the hands, this would permit designing gloves or mittens. If the parts of the pant leg would cover the feet it would be possible to design socks, tights, panties, etc.

The above mentioned parametric coordinates that define the garment mold (11, 12, 13) form a three-dimensional mesh or a parametric surface. And the aforementioned selected areas to be loosened and/or tightened with the aim to adapt the garment mold to the body, comprise transversal sections at different heights of the garment mold defined by adjacent nodes of the above mentioned three-dimensional mesh located in the same level or by parametric heights in the above mentioned parametric surface. These transversal sections must be modifiable by means of selection and changes on screen using CAD tools. Alternatively, looseness changes can be done drawing, by means of CAD tools, a two-dimensional silhouette of the desired design and modifying, via computer and in an automatic way, the three-dimensional garment mold to get it adapted to the above mentioned two-dimensional silhouette. Another alternative possibility that offers the method of this invention comprises selecting, via CAD tools, one point and an influence area around this point on the surface of the garment mold and modifying the surface in the above mentioned point and its influence area.

The above mentioned step of cutting and removing selected parts of the garment mold comprises, first of all, selecting a point of view for the three-dimensional image of the body and the garment mold. Then, drawing, by means of certain tools, some cut lines on the garment mold, selecting one or more parts to be deleted from among the parts in which the garment mold has been divided by these cut lines. And, finally, executing an order to remove the selected parts.

The method of this invention comprises an additional step consisting of introducing via computer different complementary attributes to the garment mold including fabric's characteristics. Such as: type; texture or embossed; color and/or print; grade of transparency, and/or accessories, such as: pockets; belt-eyes; buttons; buttonholes; among others. Apart from this, it is possible to digitally animate the body with the garment mold, including dynamic characteristics of the chosen fabric according to realistic models. Carrying out all or some of the above mentioned steps, the designer can create one or more garments from the changes made on the garment mold of the topology initially selected. Moreover, the designer can have a very realistic perception of the result of his/her creation.

Finally, the method of this creation comprises an additional step of designing via computer quartering patterns starting from the information defined by the garment mold modeled according to the desired design. To achieve this, the designer draws, by means of CAD tools, some seam lines on the garment mold to delimit different assembly pieces. Automatically the computer makes a cut along the above mentioned seam lines, separates each assembly piece and carry out a planar development according to a flattening algorithm. With these steps, the entire design process, from the garment basic lines to the garment patterns, is completed. Moreover, the computer details of the patterns are easily processed and exported to be understood by a robotic device of lay out and cut of patterns on conventional fabric.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
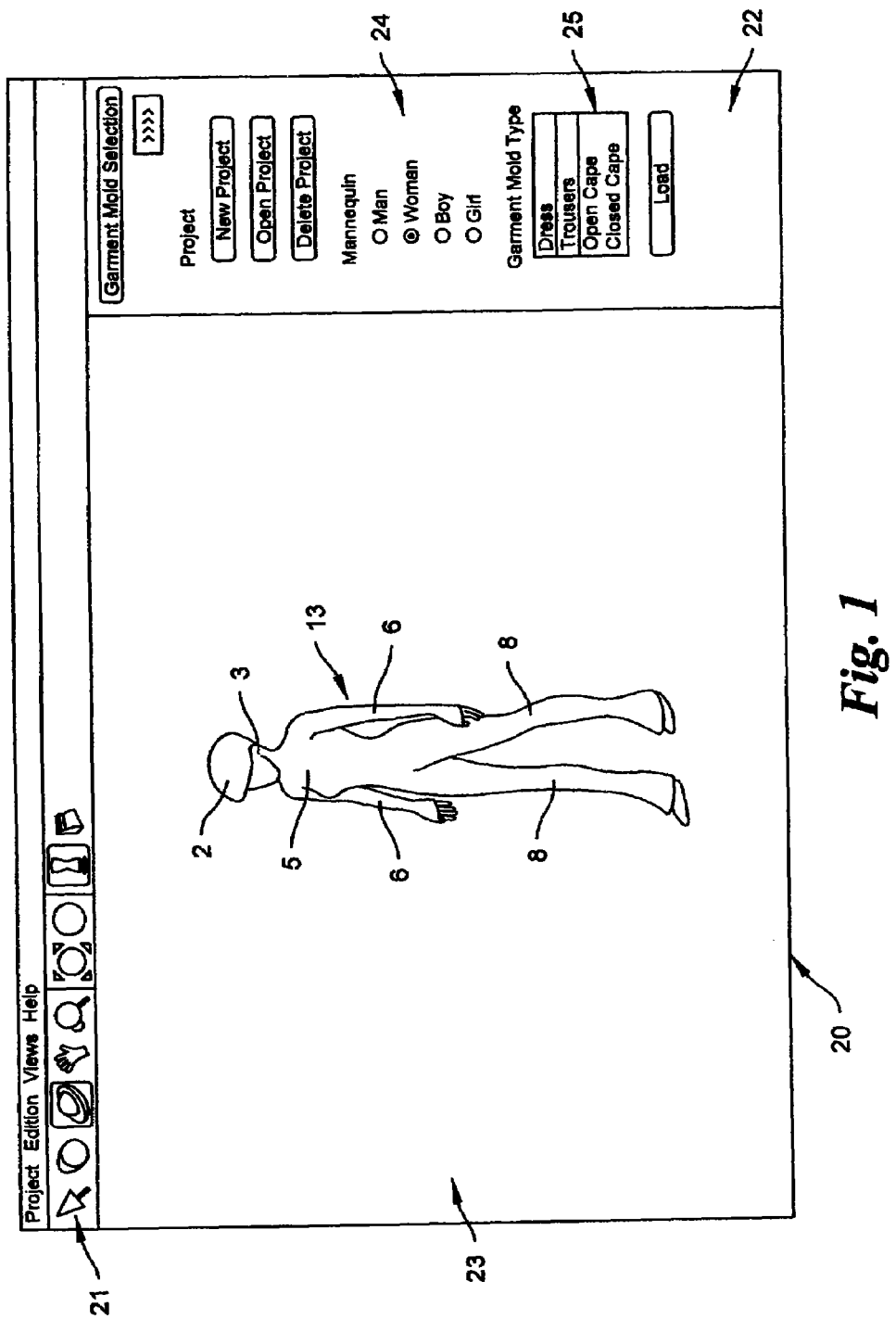
FIG. 1 is a view that shows a computer program screenshot adapted to select a garment mold according to the design method of this invention.

Referring, first of all, to FIG. 1, by means of the numerical reference 20, we portray a computer-assisted design program (DAO or CAD) screenshot implemented by the method for designing garments of this invention. The screenshot 20 includes a horizontal menu bar 21, a vertical menu bar 22 and a space of visualization 23. The aforementioned vertical menu bar 22 includes a series of computer tools to carry out the first step of the method: selecting a body and a garment mold as starting points for the design.

A mannequin's 24 options menu in the vertical menu bar 22 permits selecting the body 2 on which you want to design one or more garments, starting from the options included. For example, a man mannequin, a woman mannequin, a boy mannequin and a girl mannequin. These body options are anatomical three-dimensional mannequins of human bodies previously defined by parametric coordinates and stored in, at least, one RAM. In the illustrated example, the selected body 2 is a woman mannequin displayed in the above mentioned space of visualization 23.

Figure 6:
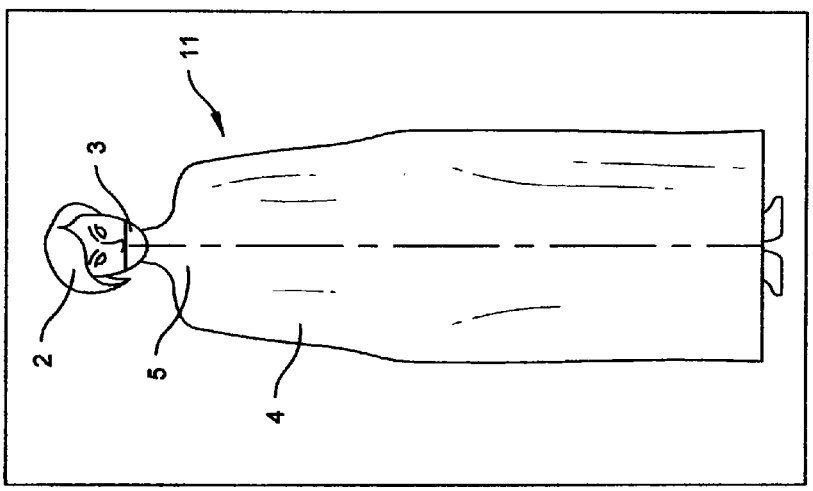
FIGS. 6 and 7 are views that show alternative garment molds which can be selected in the FIG. 1 step.
Figure 7:
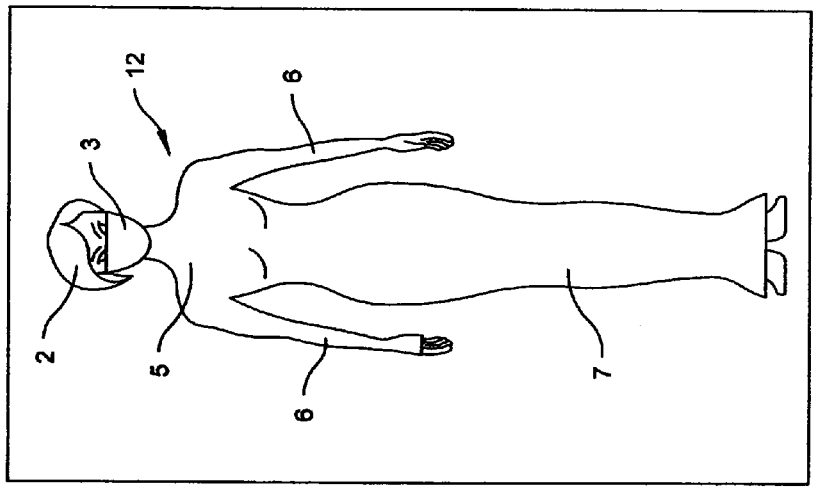

A garment mold 25 options menu in the vertical menu bar 22 permits selecting a garment mold topology from which the design will be done starting from the options included. These options are, for example, trousers 13, dress or skirt 12, and cape 11 topologies garment molds. In the illustrated example, the selected garment mold is a mold with the topology of pants 13 shown in the space of visualization 23 covering almost the whole body 2. In FIGS. 6 and 7 one mold with the topology of cape 11 and another one with the topology of skirt 12 are shown, these will be described in detail below. The garment molds 11, 12, 13 are made up of basic three-dimensional surfaces, personified by the body 2 enveloping cover. They have to be previously defined by means of parametric coordinates and stored in a RAM.

Following with the FIG. 1, the garment mold with the topology of pants 13 includes a part of the neck 3, that covers the neck of the body 2 at least to half of the head; a part of the torso 5, that covers the torso of the body 2 from the neck to the waist; two parts of sleeve 6, each one covers a respective arm of the body 2 from the torso at least to half of the hand; and two parts of pant leg 8, each one covers a respective leg of the body 2 from the waist at least to the floor. The different garment mold 13 parts 3, 5, 6, 8 are interconnected in a continuous way. Each of the aforementioned parts is a hollow spindle constituted using parameters according to conventional tailoring measurements.

Initially, the garment mold 13 is substantially closely adjusted to the body and the next step of the method of this invention comprises adapting, via computer, the garment mold 13 to the above mentioned body 2. This would be done loosening and/or tightening different selected areas of the garment mold 13 with respect to the body 2, according to a desired design. To achieve this, and as it is shown in the FIG. 2, the aforementioned computer-assisted program for designing implemented by the method provides another screenshot 30 that includes a horizontal menu bar 31, a vertical menu bar 32 and two spaces of visualization 33, 34. In the illustrated example, the above mentioned parametric coordinates that define the garment mold 13 constitute a three-dimensional mesh or a parametric surface, shown in one of the aforementioned spaces of visualization 33. This three-dimensional mesh comprises transversal sections 15 at different heights of the garment mold defined by adjacent nodes 16 located in the same level. In the case (not shown) of a surface, the sections would be defined by parametric heights.

The vertical menu bar 32 includes a section selection menu 35. This menu permits selecting one of the aforementioned sections marking it and modifying it with the cursor on the garment mold 13. In the other space of visualization 34 the selected section 15 is shown with its respective nodes 16. A section 36 edition options menu located in the vertical menu bar 32 permits loosening and/or tightening the section 15. This would be done working on the nodes 16 with the aim to adapt the selected area of the garment mold 13 to the body 2. The result is immediately displayed on the garment mold 13 in the space of visualization 33. Repeating these steps on different sections, the garment mold 13, initially closely adjusted to the body 2, obtains the desired shape and volume.

However, this is the not the only option offered in this method to loosen or tighten different parts of the garment mold 13. This means that the program implemented by the method offers, alternatively, computer-assisted tools for designing (not shown) to draw a two-dimensional silhouette of the desired design. Then the garment mold 13 has to be automatically modified via computer to get it adapted to the above mentioned two-dimensional silhouette. Another option of the program comprises computer tools to select one point and an influence area around it on the garment mold surface. In a second stage it is necessary to modify the surface of the aforementioned point and its influence area according to the desired design.

Figure 3:
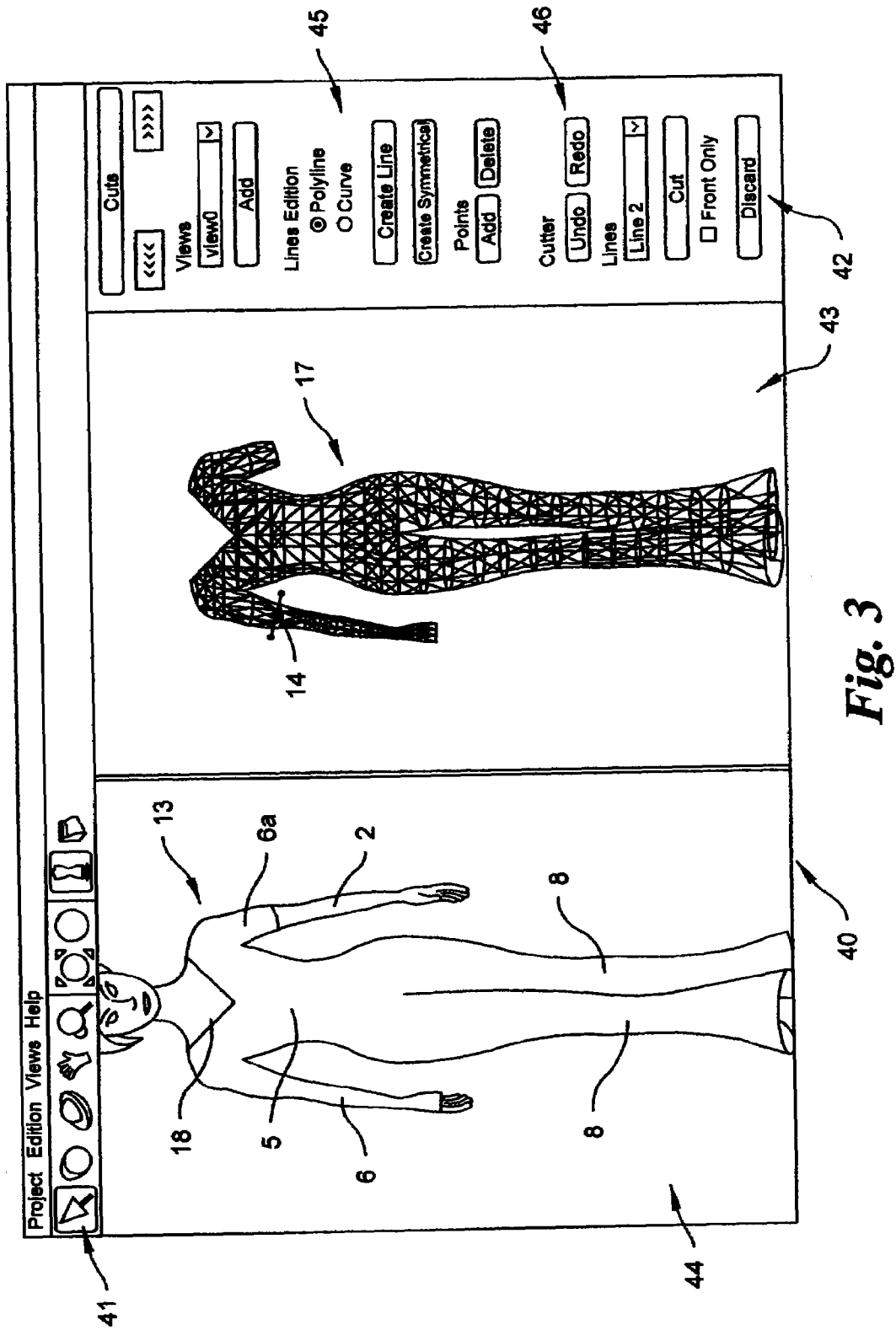
FIG. 3 is a view that shows a computer program screenshot adapted to cut and remove parts of the garment mold.

Referring now to the FIG. 3, it shows a new screenshot of the computer-assisted program for designing implemented by the method of this invention. The screenshot 40 is adapted to permit carrying out the next step of the method, cutting and removing via computer selected parts of the garment mold 13 according to the desired design. To achieve this, the screenshot 40 includes a horizontal menu bar 41, a vertical menu bar 42 and two spaces of visualization 43, 44. One of the above mentioned spaces of visualization 43 shows the three-dimensional mesh 17 of the garment mold 13. In the meantime, the other space of visualization 44 shows the garment mold 13 adapted to the body 2.

The vertical menu bar 42 includes a cut lines edition menu 45 that permits creating and/or editing cut lines on the three-dimensional mesh 17, such as the cut line 14 shown in the FIG. 3. An execution cuts menu 46 makes it possible to cut the garment mold 13 along the cut line 14 and remove the desired part, previously selected. The result is immediately shown in the garment 13 displayed in the space mold of visualization 44. In the illustrated example in the FIG. 3, the parts of the neck and the torso of the garment mold 13 have been cut to create a V-neckline 18. Part of the left sleeve has been cut as well to create a short sleeve 6a. The right sleeve 6 is just about to be cut symmetrically along the cut line 14. The program permits choosing the best point of view of the three-dimensional image of the body 2 with the garment mold 13.

Figure 2:
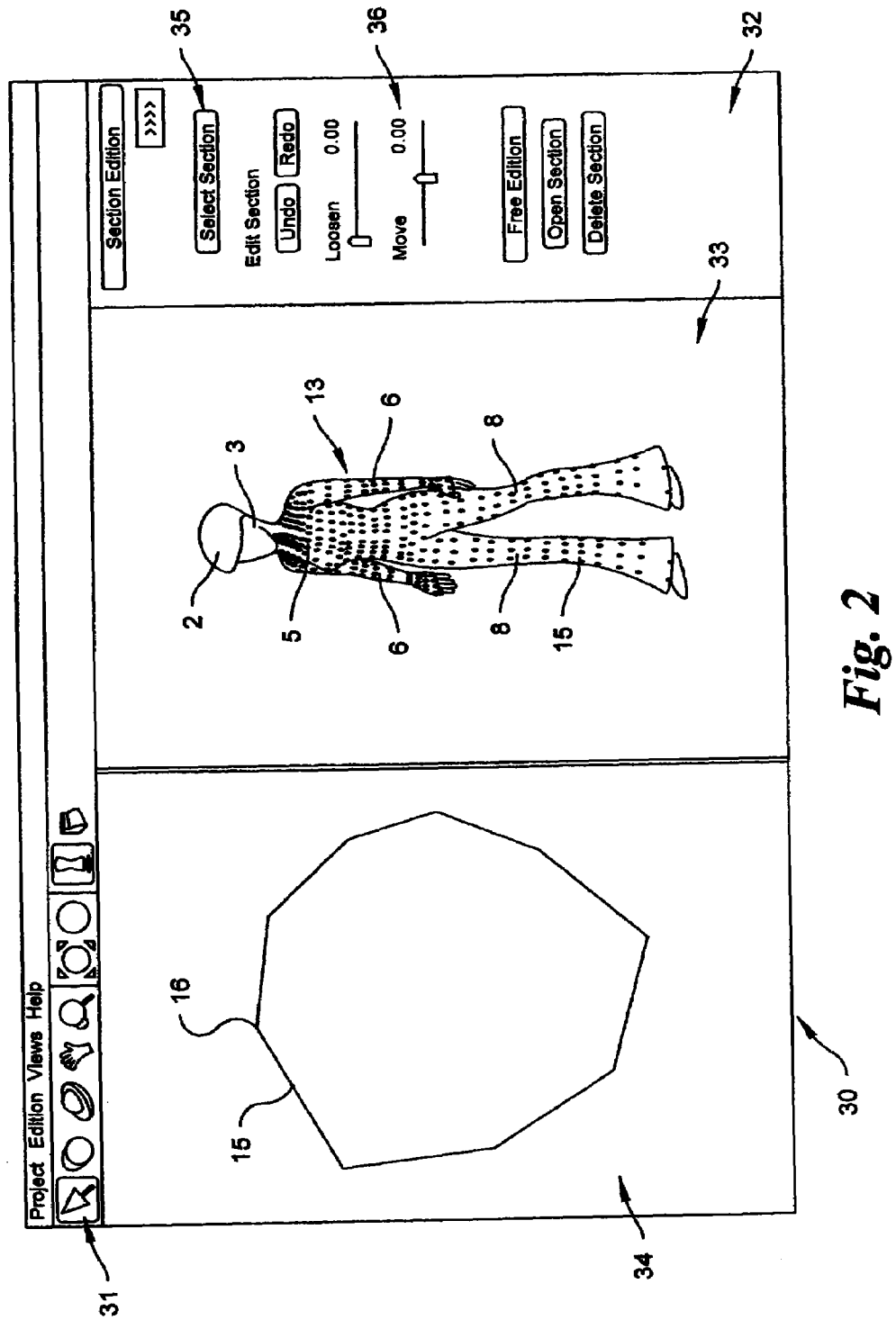
FIG. 2 is a view that shows a computer program screenshot adapted to shape the garment mold.

The aforementioned steps of adapting the garment mold 13 loosening and/or tightening, cutting and removing parts of the garment mold 13 can be done in any order and/or even combined in partial stages changing successively between, for example, the screenshots 30, 40 shown in FIGS. 2 and 3.

Figure 4:
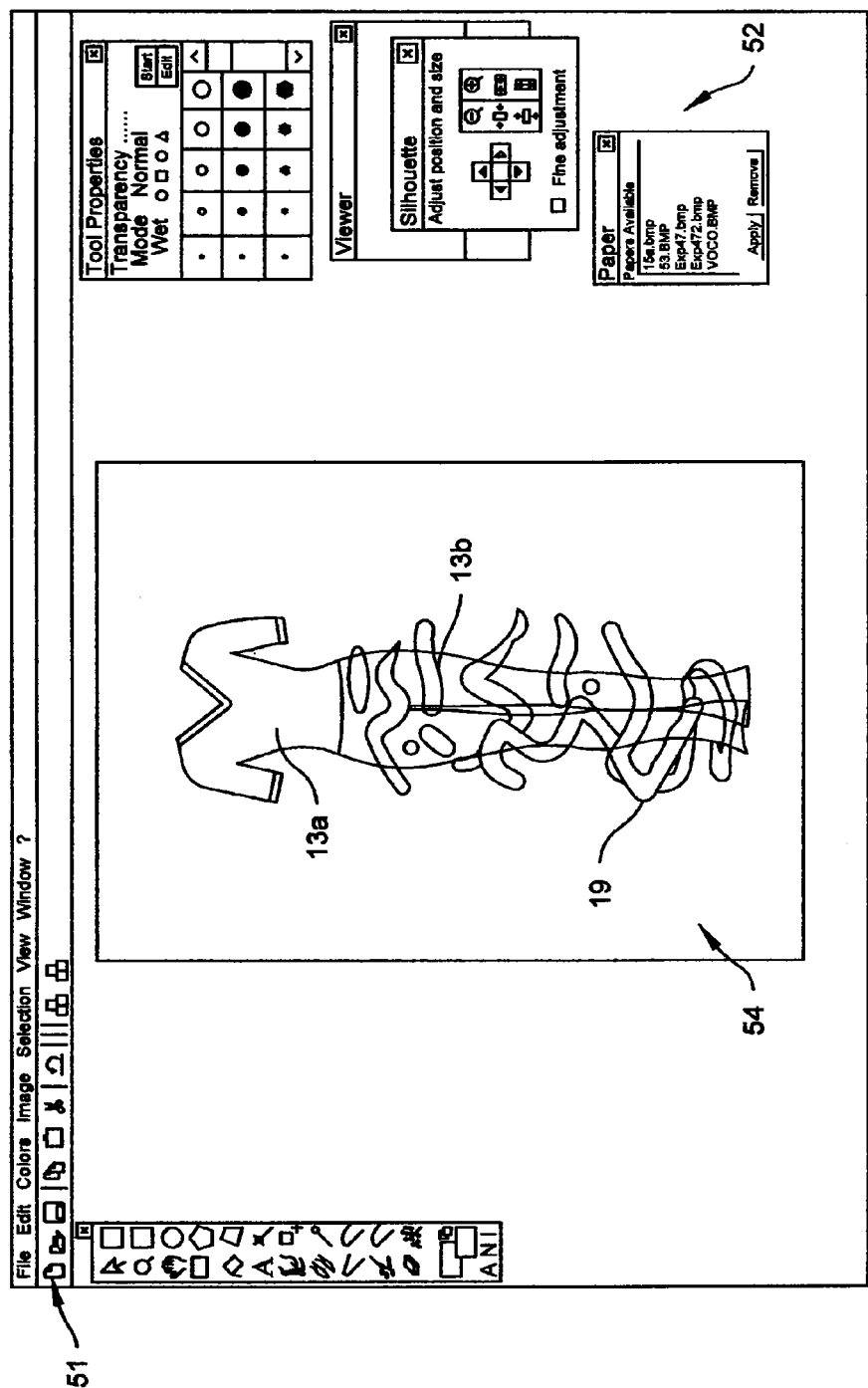
FIG. 4 is a view that shows a computer program screenshot adapted to introduce attributes to the garment mold.

The method of this invention comprises as well an additional step of introducing attributes to the garment mold 13. This step is implemented, for example, by means of a screenshot 50 as the one shown in the FIG. 4. This screenshot includes a horizontal menu bar 51 and some floating menus 52, 53 next to a space of visualization. This space of visualization shows a two-dimensional image of the garment mold 13 with the shape obtained from carrying out the above mentioned steps. In the illustrated example, apart from the cuts described with respect to the FIG. 3, another two contiguous cuts have been made at the waist. The part left between these two cuts has been removed to obtain an outfit of short-sleeve T-shirt 13a and bell-bottomed trousers 13b.

The floating menus 52, 53 provide computer-assisted design tools to introduce attributes to the garment mold 13. Or, more strictly, to the parts 13a, 13b which the garment mold 13 has been divided in. These attributes include fabric's characteristics, such as type, texture and/or embossed, grade of transparency, flexibility, etc. It permits as well introducing color and/or print to selected parts 13a, 13b of the garment mold 13. In this stage it is possible as well to add accessories to the parts 13a, 13b, such as pockets, belt-eyes, buttons, buttonholes, etc. In general, all these attributes can be selected among a variety of attributes previously created and stored in a classified way in one or more RAM. However, as an alternative, for example, a print 19 can be drawn on screen 50 directly on the two-dimensional image of the garment mold 13 or any of its parts 13a, 13b.

Figure 5:
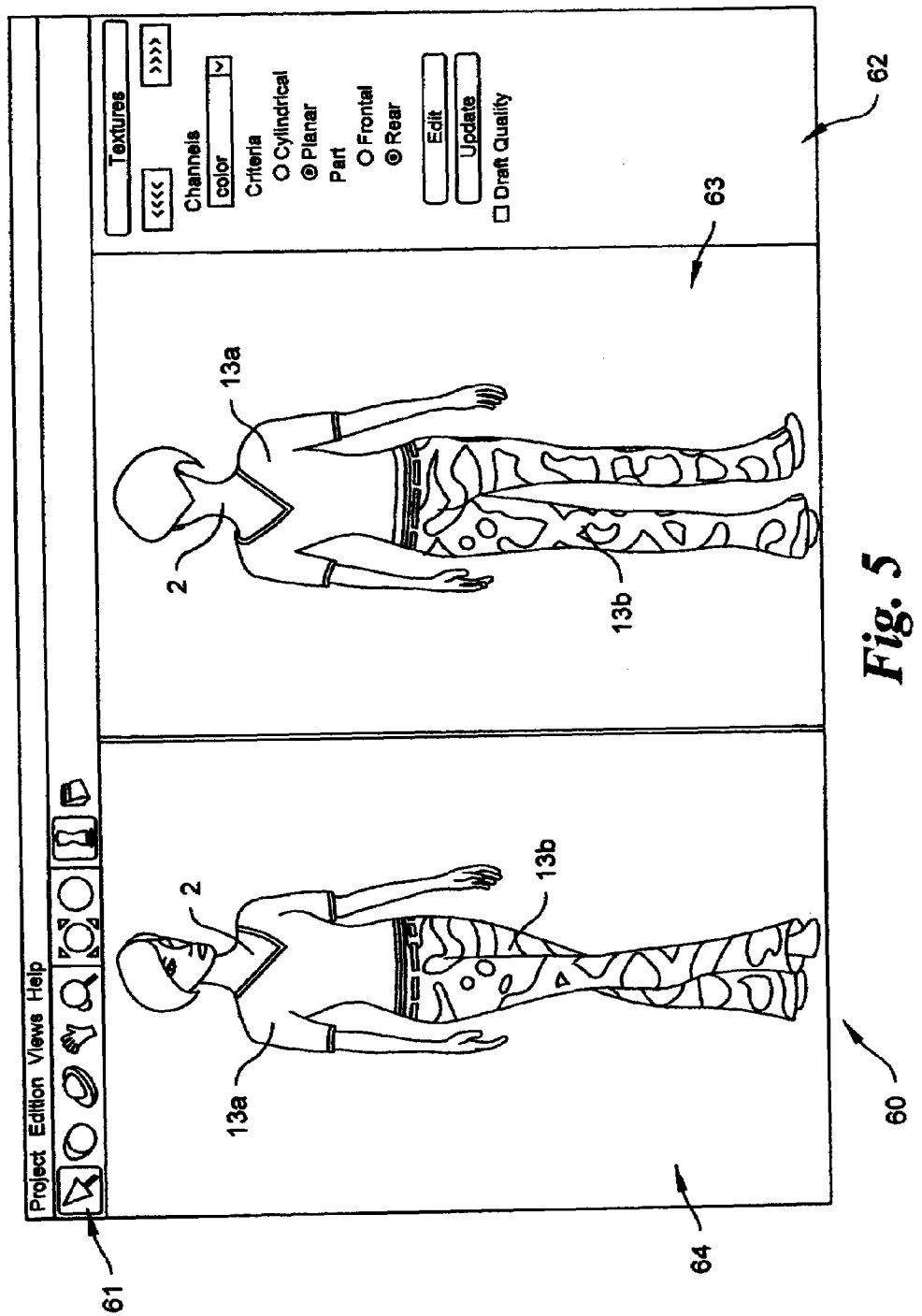
FIG. 5 is a view that shows a computer program screenshot adapted to show the final result of the design process.

Finally, with reference to the FIG. 5, another screenshot 60 of the program implemented by the method of this invention provides computer tools to adjust and visualize in three dimensions the result obtained after having introduced attributes to the garment mold, which was done in the previous step. This constitutes the final result of the garment creation process. To achieve this, the screenshot 60 includes a horizontal menu bar 61, a vertical menu bar 62 and two spaces of visualization 63, 64. The space of visualization 63 displays a rear view of the parts 13a, 13b of the garment mold 13 adapted to the body 2. While the other space of visualization 64 displays a frontal view of the parts 13a, 13b of the garment mold 13 adapted to the body 2. Of course, the computer tools permit selecting different views in the spaces of visualization 63, 64. The computer tools permit an additional step that comprises digitally animating the body 2 along with the garment mold 13, including the introduction of dynamic characteristics of the chosen fabric, based on realistic models. The result is a virtual exhibition of tailored designs.

In the example illustrated in FIGS. 1 to 5 a garment mold with the topology of pants 13 (above described) has been selected to design an outfit of short-sleeve T-shirt 13a and bell-bottomed trousers 13b. In fact, starting from the garment mold with the topology of pants 13 it is possible to design other garments, such as, for example, long trousers, short trousers, underwear, swimsuits, T-shirts, sweaters, jumpsuits, dungarees, jackets, etc. However, certain garments cannot be created starting from the mold with the topology of pants 13.

Referring now to FIGS. 6 and 7, to cover practically all the possible garments, the garment mold selection options include, apart from the mold with the topology of pants 13 described above, a garment mold with the topology of cape 11, shown in FIG. 6. It includes a part of the neck 3, that covers the neck at least to half of the head, and a part of the body 4, that covers globally the whole body at least to the floor. And a mold with the topology of skirt 12, shown in FIG. 7, that include a part of the neck 3, that covers the neck at least to half of the head, a part of the torso, that covers the torso from the neck to the waist, two parts of sleeve 6, each one covers a respective arm from the torso at least to half of the hand, and a part of pant leg 7, that globally covers both legs from the waist at least to the floor.

It can be seen that the molds with the topology of skirt 12 and pants 13 only differ from each other in the parts of the pant leg 7 and 8, respectively, located under the waist. This means that garments above mentioned in relation with the mold with the topology of pants 13, such as T-shirts, jackets or sweaters, could be obtained in the same way using the garment mold with the topology of skirt 12. However, other garments, such as long skirts, short skirts, jumpers with bibs, and any kind of long and short dresses, with or without sleeves, can only be obtained using the mold with the topology of skirt 12. The mold with the topology of cape 11 permits obtaining a variety of capes and other garments fruit of the designer imagination.

It is possible to obtain two or more garments simultaneously starting from the same garment mold on condition that the garments do not overlap. The T-shirt 13a and trousers 13b described in relation with FIGS. 1 to 5 are an example. In case the garments overlap, each garment has to be obtained separately starting from different garment molds, with the same or different topology. Moreover, including garment mold with any topology 11, 12, 13 covering the whole head (not shown) it would be possible to design, for example, caps, hats, ski masks, etc. as well as certain garments with hood. In the same way, including garment molds with the parts of sleeve covering the whole hands it would be possible to design gloves and mittens. And including garment molds with the parts of the pant leg covering the whole feet, it would be possible to design socks, tights, panties, etc.

Figure 8:
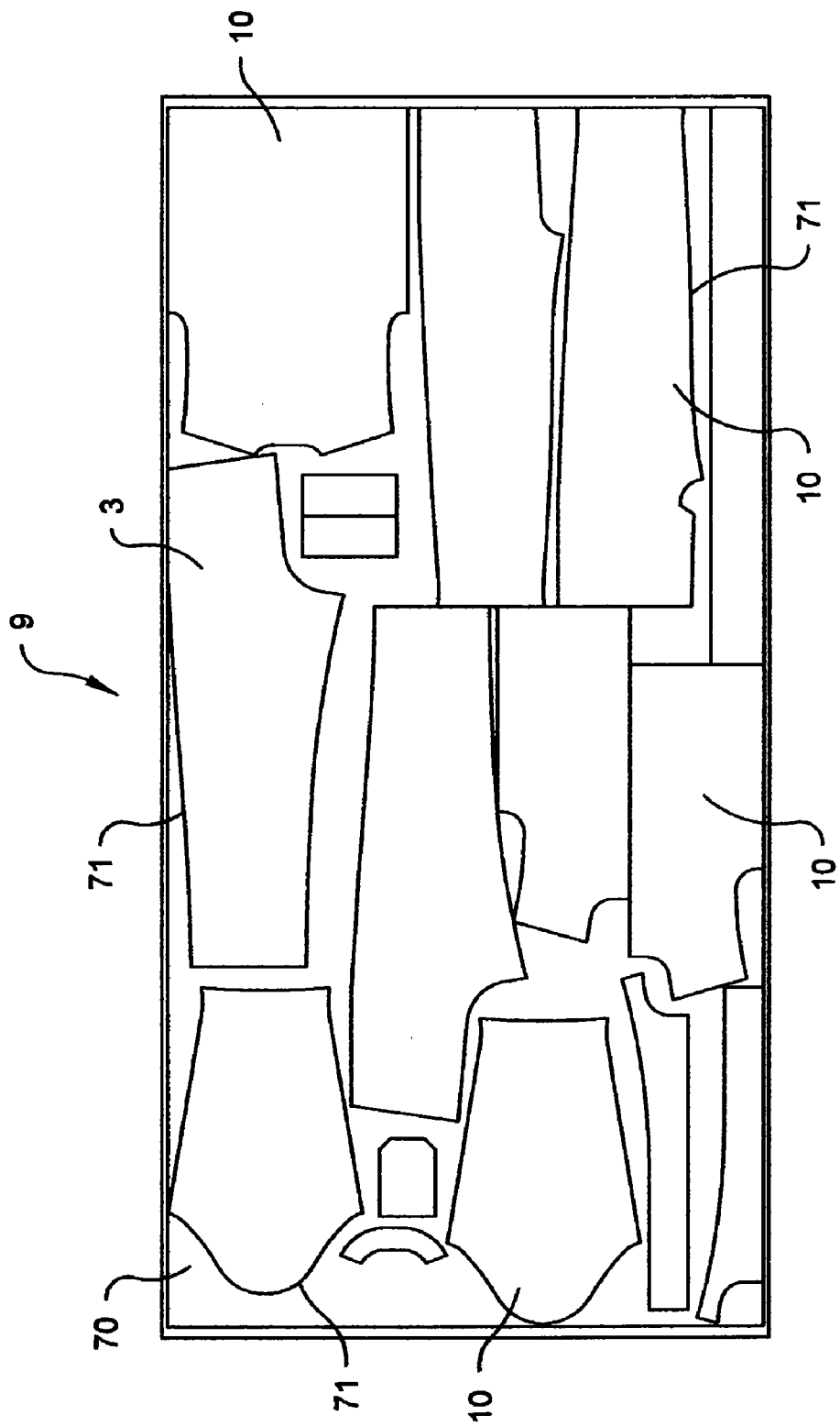
FIG. 8 is a schematic view that shows a distribution on a fabric piece of quartering patterns of some garments, such as those shown in FIG. 5. These patterns are obtained with the design method of this invention.

Finally, in relation with FIG. 8, the method of this invention comprises an additional step of designing via computer some quartering patterns 9 starting from the information as defined by the garment mold 11, 12, 13, modeled according to the desired design. To achieve this, the program implemented by the method provides some computer-assisted design tools that permit to draw some seam lines on the garment mold 11, 12, 13 to delimit different assembly pieces 10. The method provides as well with some computer tools that automatically cut along the above mentioned seam lines, separate the aforementioned assembly pieces 10 and carry out a planar development according to a flattening algorithm. Finally, the method deals with and exports some computer details of the assembly pieces 10 that constitute the patterns 9. This is done by means of a control program for a robotic device (not shown) of pattern lay out and cut on fabric 70. In FIG. 8 we portray a fabric piece on top of which the patterns of different garments have been laid out with a rational assembly criteria. The arrangement shown is automatically done by the aforementioned robotic device. It can include drawing some cut lines 71 to delimit assembly pieces 10 or an execution of these cut lines 71 in order to obtain different and separate assembly pieces 10.

An expert on the subject can easily think of some modification without getting off the scope of this invention, as it is defined in the enclosed claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A computer-assisted method for designing garments that comprises the following steps:
   a) providing, via computer, at least one garment-shaped blank (11, 12, 13) made up of a basic idealized three-dimensional surface, said surface being a body (2) enveloping cover, said garment-shaped blank (11, 12, 13) being defined by parametric coordinates;
   b) adapting, via computer, the garment-shaped blank (11, 12, 13) to the above mentioned body (2) by loosening or tightening different selected areas of the garment-shaped blank (11, 12, 13) with respect to the body (2) according to a desired design; and
   c) cutting and removing, via computer, selected parts of the garment-shaped blank (11, 12, 13) according to the aforementioned desired design,
   wherein the above mentioned body (2) is an anatomical three-dimensional mannequin of a human body defined, via computer, by parametric coordinates, and the garment-shaped blank (11, 12, 13) is closely adjusted to the body (2) at the moment the work begins,
   wherein the aforementioned garment-shaped blank (11, 12, 13), which is at least one, comprises various parts (3, 4, 5, 6, 7, 8) that are mutually interconnected in a continuous way and each of these parts is a hollow spindle,
   wherein the step a) comprises selecting a garment-shaped blank from among a group of some garment-shaped blanks with different topologies, previously defined and stored in, at least, one RAM,
   wherein the above mentioned group of garment-shaped blanks (11, 12, 13), previously defined, includes, at least, one garment-shaped blank with the topology of cape (11), one with the topology of skirt (12) and one with the topology of pants (13), and wherein the garment-shaped blank with the topology of skirt (12) includes, from said various parts (3, 4, 5, 6, 7, 8), at least:

a neck part (3), that enveloping covers the neck of said body (2) at least to approximately half of the head;

a torso part (5), that enveloping covers the torso of said body (2) from the neck to the waist;

two sleeve parts (6), each one enveloping covering a respective arm from the torso at least to approximately half of a hand, of said body (2), and a pant leg part (7) that enveloping covers globally both legs of said body (2) from the waist to at least approximately a virtual floor supporting said three-dimensional mannequin (2).

2. A computer-assisted method for designing garments that comprises the following steps:

a) providing, via computer, at least one garment-shaped blank (11, 12, 13) made up of a basic idealized three-dimensional surface, said surface being a body (2) enveloping cover, said garment-shaped blank (11, 12, 13) being defined by parametric coordinates;

b) adapting, via computer, the garment-shaped blank (11, 12, 13) to the above mentioned body (2) by loosening or tightening different selected areas of the garment-shaped blank (11, 12, 13) with respect to the body (2) according to a desired design; and c) cutting and removing, via computer, selected parts of the garment-shaped blank (11, 12, 13) according to the aforementioned desired design, wherein the above mentioned body (2) is an anatomical three-dimensional mannequin of a human body defined, via computer, by parametric coordinates, and the garment-shaped blank (11, 12, 13) is closely adjusted to the body (2) at the moment the work begins, wherein the aforementioned garment-shaped blank (11, 12, 13), which is at least one, comprises various parts (3, 4, 5, 6, 7, 8) that are mutually interconnected in a continuous way and each of these parts is a hollow spindle, wherein the step a) comprises selecting a garment-shaped blank from among a group of some garment-shaped blanks with different topologies, previously defined and stored in, at least, one RAM, wherein the above mentioned group of garment-shaped blanks (11, 12, 13), previously defined, includes, at least, one garment-shaped blank with the topology of cape (11), one with the topology of skirt (12) and one with the topology of pants (13), and wherein the garment-shaped blank with the topology of pants (13) includes, from said various parts (3, 4, 5, 6, 7, 8), at least:

a neck part (3) that that enveloping covers the neck of said body (2) at least to approximately half of the head;

a torso part (5), that enveloping covers the torso of said body (2) from the neck to the waist;

two sleeve parts (6), each one enveloping covering a respective arm from the torso at least to approximately half of a hand, of said body (2), and two pant leg parts (8), each one enveloping covering a respective leg of said body (2) from the waist to at least approximately a virtual floor supporting said three-dimensional mannequin (2).

3. A computer-assisted method for designing garments that comprises the following steps:

a) providing, via computer, at least one garment-shaped blank (11, 12, 13) made up of a basic idealized three-dimensional surface, said surface being a body (2) enveloping cover; said garment-shaped blank (11, 12, 13) being defined by parametric coordinates;

b) adapting, via computer, the garment-shaped blank (11, 12, 13) to the above mentioned body (2) by loosening or tightening different selected areas of the garment-shaped blank (11, 12, 13) with respect to the body (2) according to a desired design; and c) cutting and removing, via computer, selected parts of the garment-shaped blank (11, 12, 13) according to the aforementioned desired design, wherein the above mentioned body (2) is an anatomical three-dimensional mannequin of a human body defined, via computer, by parametric coordinates, and the garment-shaped blank (11, 12, 13) is closely adjusted to the body (2) at the moment the work begins, wherein the aforementioned parametric coordinates that define the garment-shaped blank (11, 12, 13) constitute a three-dimensional mesh or a parametric surface, and wherein the step c) comprises:

selecting a point of view for the three-dimensional image of the body (2) and the garment-shaped blank (11, 12, 13);

drawing, via CAD tools, some cut lines (14) on the garment-shaped blank (11, 12, 13);

selecting one or more parts to be deleted from among the parts in which the garment-shaped blank (11, 12, 13) has been divided by these cut lines (14); and finally, executing an order to remove the selected parts.

\* \* \* \* \*